United States Patent [19]

Goto

[11] Patent Number: 4,897,751

[45] Date of Patent: Jan. 30, 1990

[54] RECORDING TAPE CARTRIDGE

[75] Inventor: Shinichi Goto, Kyoto, Japan

[73] Assignee: Hitachi Maxell, Ltd., Osaka, Japan

[21] Appl. No.: 251,996

[22] Filed: Sep. 30, 1988

Related U.S. Application Data

[63] Continuation of Ser. No. 920,943, Oct. 20, 1986, abandoned, which is a continuation of Ser. No. 494,069, May 12, 1983, abandoned.

[30] Foreign Application Priority Data

| May 12, 1982 | [JP] | Japan | 57-69983[U] |
| May 12, 1982 | [JP] | Japan | 57-69985[U] |
| Sep. 21, 1982 | [JP] | Japan | 57-143527[U] |
| Feb. 8, 1983 | [JP] | Japan | 58-17184[U] |

[51] Int. Cl.⁴ ............................................. G11B 23/02
[52] U.S. Cl. ............................................................ 360/132
[58] Field of Search .................... 360/132, 93, 83, 90; 242/198, 199; 200/302.1

[56] References Cited

U.S. PATENT DOCUMENTS

| 4,235,395 | 11/1980 | Wardenaar et al. | 360/132 |
| 4,418,373 | 11/1983 | Fujimori et al. | 360/132 |
| 4,449,677 | 5/1984 | Ohta et al. | 360/132 |
| 4,608,616 | 8/1986 | Wakui et al. | 360/132 |

FOREIGN PATENT DOCUMENTS

| 0062877 | 4/1983 | Japan | 360/132 |
| 0113379 | 6/1985 | Japan | 360/132 |
| 0113382 | 6/1985 | Japan | 360/132 |
| 0032284 | 2/1986 | Japan | 360/132 |

Primary Examiner—John H. Wolff
Assistant Examiner—Andrew L. Sniezek
Attorney, Agent, or Firm—Birch, Stewart, Kolasch & Birch

[57] ABSTRACT

In a recording tape cartridge having a front lid member movable between a closed position for protecting a recording tape and an opened position and a dust cover movable with the front lid member for defining a tape accommodating space therebetween, the lower end portion of the dust cover has a closing portion extending below the lower end of the front lid member when the front lid member is in the closed position so that dust or foreign matter is prevented from entering the tape accommodating space through the gap between the front lid member and the dust cover.

4 Claims, 8 Drawing Sheets

RECORDING TAPE CARTRIDGE

This application is a continuation of application Ser. No. 06/920,943 filed on Oct. 20, 1986, which is a continuation of application Ser. No. 494,069 filed May 12, 1983, both now abandoned.

FIELD OF THE INVENTION

The present invention relates to a recording tape cartridge in which a front lid member having a dust cover for protecting a recording tape from dust is pivotally mounted to the front surface of a cartridge case in a movable manner between a closed position for blocking the front surface of the cartridge case and an upward opened position.

BACKGROUND OF THE INVENTION

In a video tape cartridge such as that shown in FIG. 1, a cartridge case 1 is provided on its front surface with a front lid member 9 which is locked in a closed position when the video tape cartridge is not in use for covering and protecting the recording surface of a video tape 2 extending along the front surface of the cartridge case 1. However, since a pocket member 7 is formed in the bottom wall of the front part of the cartridge case 1 in a recessed manner widely along the longitudinal direction for receiving a tape loading member provided in a video tape player, the video tape 2 is apt to be damaged by dust entering the cartridge case 1 through upper and lower openings of the pocket member 7 as well as touched by fingers of operators.

For overcoming the aforementioned disadvantage, there has been proposed a video tape cartridge in which a dust cover 12 is arranged on the inner side of the front lid member 9 along the pocket 7, as shown in FIG. 3 to cover inner side portions, including lower portions, of the video tape 2 and the upper opening of the pocket member 7 when the tape cartridge is not used, thereby preventing dust from sticking to the video tape 2.

In such a proposed tape cartridge, however, it is difficult to bring the lower end of the dust cover 12 properly and closely into contact with a vertical inner surface 10a of the front plate 10 of the front lid member 9 with respect to accuracy as to dimensions, leading to defining an undesired gap therebetween, through which dust enters a tape space between the front lid member 9 and the dust cover 12. Therefore, there still remains a disadvantage that the video tape is stained by dust.

SUMMARY OF THE INVENTION

An essential object of the present invention is to provide a recording tape cartridge which has a movable front lid member and a dust cover mounted to the front lid member for enclosing a recording tape when the tape cartridge is not in use, in which the lower ends of the front lid member and the dust cover can be securely sealed to prevent dust from entering a tape space between the lid member and the dust cover, thereby preventing the recording tape from being stained by dust or the like.

Another object of the present invention is to provide a recording tape cartridge in which sealing between the front lid member and the dust cover is assured without requiring strict accuracy as to dimensions.

According to the present invention, forms of the lower end of a front plate of a front lid member and the lower end of a dust cover are so arranged that dust is prevented from entering through an undesired gap defined between contact surfaces of the lower end of the front plate of the front lid member and the lower end of the dust cover without requiring strict accuracy as to dimensions.

DESCRIPTION OF THE PREFERRED EMBODIMENTS

Figure 1:
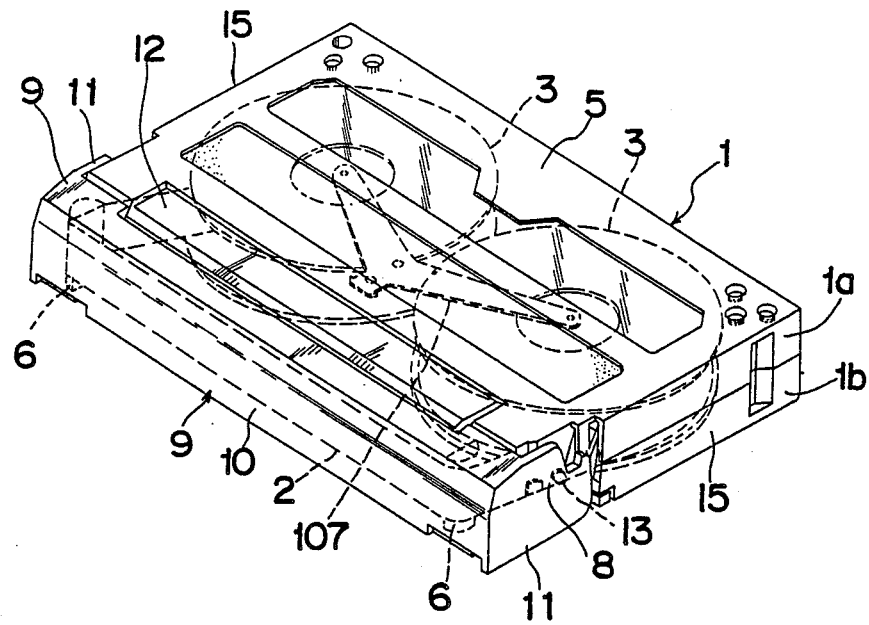
FIG. 1 is a perspective view showing a recording tape cartridge.
Figure 2:
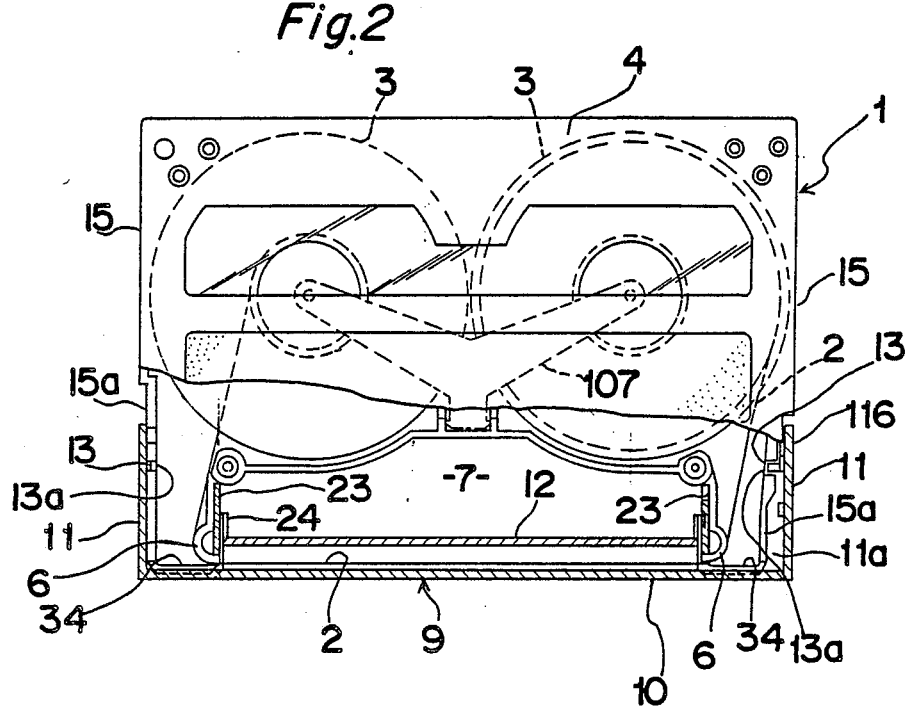
FIG. 2 is a top plan view of the recording tape cartridge shown in FIG. 1.
Figure 3:
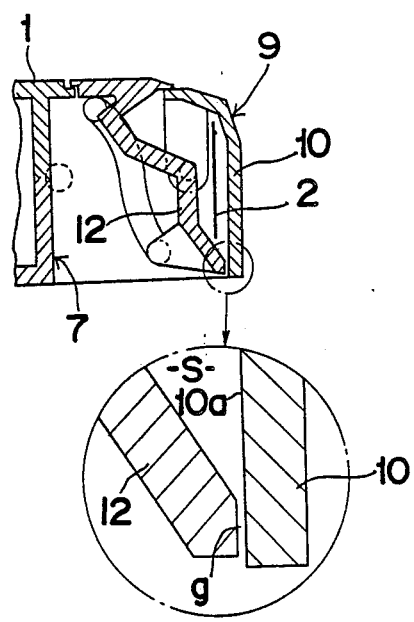
FIG. 3 is a cross sectional view of an example of a conventional arrangement of a front lid member and a dust cover showing a disadvantage being inherent in the recording tape cartridge shown in FIG. 1.

Referring to FIGS. 1 and 2 of the drawings, there is shown a small-sized video tape cartridge in which an arrangement of a front lid member and a dust cover according to the present invention is employed. The video tape cartridge comprises a cartridge case 1 consisting of a top section 1a and a bottom section 1b formed of plastic resin material and connected with each other by screws in a butting manner. Within the cartridge case 1, there are provided a pair of tape reels 3 for winding a video tape 2 for recording and/or reproducing video signals. The tape reels 3 are pressed downward at their centers of rotation by a spring plate 107 which is secured to the inner surface of an upper wall member 5 of the cartridge case 1 in positions opposite to a pair of drive shaft insertion holes (not shown) defined through a bottom wall member 4 of the cartridge case 1, so that drive shafts (not shown) of the video tape player are engaged with hub openings of the tape reels 3 through the insertion holes when the cartridge case 1 is mounted in the video tape player. A pair of tape guide members 6 are provided on both sides in the front part of the cartridge case 1 for guiding the video tape 2, which is drawn out from one tape reel 3 along the front surface of the cartridge case 1 and taken up around the other tape reel 3.

A front lid member 9 for covering the front surface of the cartridge case 1 is pivotally mounted to the cartridge case 1 in a manner capable of being opened and closed.

Figure 4:
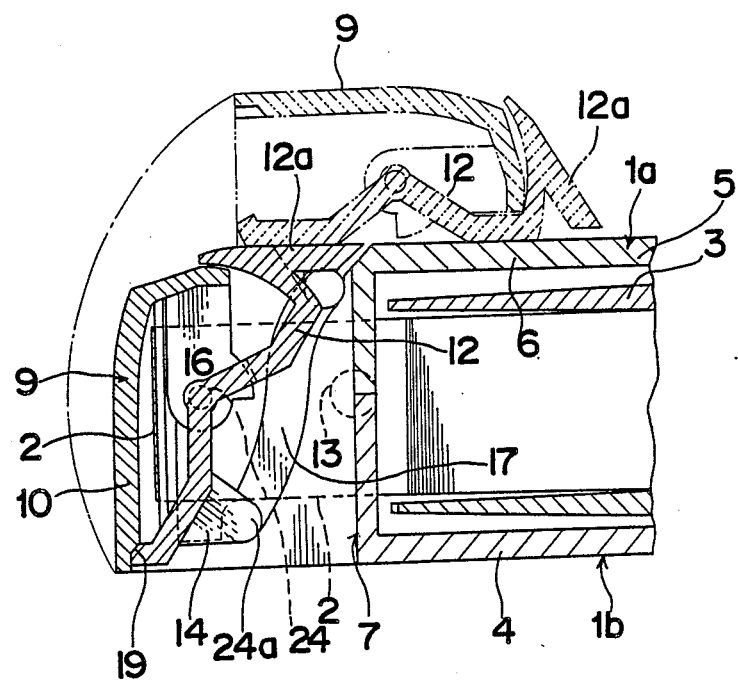
FIG. 4 is a cross sectional view showing an essential portion of an embodiment of a recording tape cartridge according to the present invention.

The front lid member 9 is formed of plastic resin material, and comprises an elongated front plate 10 extending in the longitudinal direction for covering the front surface of the cartridge case 1, a pair of connecting members 11 projecting rearward from both sides of the front plate 10 and a pair of pivotal shafts 13 projecting inward from the connecting members 11 to be opposite to each other. The connecting members 11 are engaged in stepped wall members 15a formed in front portions of a pair of side walls 15 from the cartridge case 1 in a manner stepped inwardly of the side walls 15 while the pivotal shafts 13 are rotatably engaged in through-holes 13a formed through the stepped wall members 15a. Thus, the front lid member 9 is pivotally rotatable about the pivotal shafts 13 between a closed position shown in FIGS. 1 and 4 in a solid line for covering the front surface of the cartridge case 1 and an upward opened position shown in FIG. 4 in a chain line, and is urged to the closed position by a torsion spring 11b (FIGS. 5 and 6) which is engaged with the right-hand side pivotal shaft 13. When the video tape cartridge is not used, the front lid member 9 is closed to cover the front surface of the cartridge case 1 and protect the recording surface of the video tape 2. When, in turn, the cartridge case 1 is mounted in the video tape player, the front lid member 9 is opened so that a tape loading pin (not shown) of the video tape player is inserted in a pocket member 7 defined in the bottom section 1b in the front part of the cartridge case 1 in a recessed manner for drawing out the video tape 2 frontward along the cartridge case 1. Between a forward recessed portion 15a of the right-hand side wall 15 of the cartridge case 1 and the right-hand connecting portion 11 of the front lid member 9, there is defined a clearance 11a, which contains the aforementioned torsion spring 11b and a means for locking the front lid member 9 in the closed position when the recording tape cartridge is not used. Details of the lid locking member will be explained later.

In the pocket member 7, a dust cover 12 made of an elongated plate-like member is pivotally connected to the inner side of the front lid member 9 by a pair of shafts 24 in a manner rotatable about the shafts 24. The dust cover 12 functions to closely seal the inner side portions, including the lower sides, of the video tape 2 and the upper opening of the pocket member 7, thereby preventing dust from entering through upper and lower openings of the pocket member 7 and thus protecting the video tape 2 from dust. The dust cover 12 is also movable engaged with the side walls of the cartridge case 1 with a pair of pin-shaped cam followers 24a fitted in grooves 17 provided on both side surfaces of the pocket member 7, so that, following opening of the front lid member 9, the dust cover 12 may be moved upward in association with the front lid member 9 without causing interference with the video tape 2.

As shown in FIGS. 4 through 8, the front plate 10 of the front lid member 9 is integrally provided, at portions close to both ends thereof, with a pair of dust cover mounting members 16 extending downward from the upper end portion of the front plate 10 for engaging and supporting, in a rotatable manner, the shafts 24 which project from both end portions of the vertical center of the dust cover 12. The dust cover 12 is further provided with the cam followers 24a projecting from portions close to both sides of the lower end thereof, which are slidably engaged with the cam grooves 17.

Figure 7:
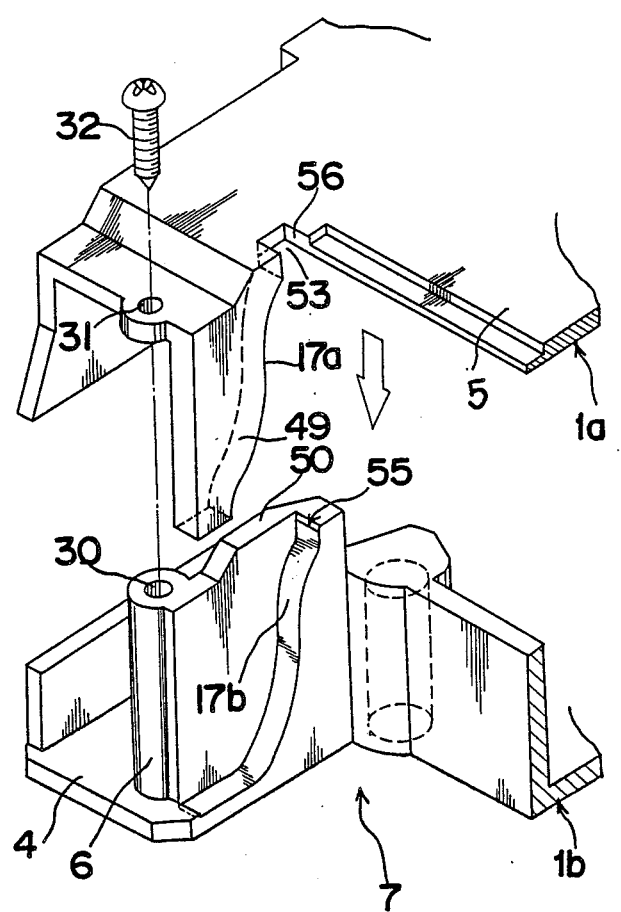
FIG. 7 is an exploded perspective view showing the arrangement of a cam groove of FIG. 4.

In FIG. 7, one of the cam grooves 17 is defined by a combination of a side wall 49 projecting downward from the forward portion of the upper wall 5 of the top section 1a and another side wall 50 integrally formed with the tape guide member 6 and projecting upward from the bottom wall 4 of the bottom section 1b. A rear end surface 17a of the downward side wall 49 and a stepped end surface 17b formed in the inner side surface of the upward side wall 50 are opposed defining therebetween one of the cam grooves 17 having a space slightly wider than the diameter of the cam follower 24a. A rectangular recess 53 bounding on the upper end of the rear end surface 17a of the side wall 49 is formed in the upper wall 5 of the top section 1a to face the pocket member 7 in such a manner that, when the top section 1a and the bottom section 1b are connected with each other to define the cam groove 17, the recess 53 communicates with the upper end of each cam groove 17 in a butting manner. That is, the upper end of the cam groove 17 is open at the upper surface of the top section 1a through the recess 53. Each of the cam followers 24a of the dust cover 12 is inserted downward in the corresponding cam groove 17 from above through the recess 53. The stepped end surface 17b forming the rear edge of the cam groove 17 is provided at its upper edge with an upwardly extending bevelled portion 55 so that, even if the stepped end surface 17b projects slightly forward over a rear edge 56 of the recess 53 by an error in production, the cam follower 24a is smoothly inserted in the cam groove 17 through the bevelled portion 55 without being caught by the upper edge of the stepped end surface 17b.

In assembling the dust cover 12, the front lid member 9 is in advance assembled with the cartridge case 1 and then the cam follower 24a is inserted from above in the cam groove 17 while effecting elastic deformation of the connecting member 14 for connection with the shaft 24, or, the dust cover 12 is in advance connected to the front lid member 9 and then the cam follower 24a is downwardly inserted in the cam groove 17 while the front lid member 9 is connected in a pivotal manner to the cartridge case 1.

Figure 8:
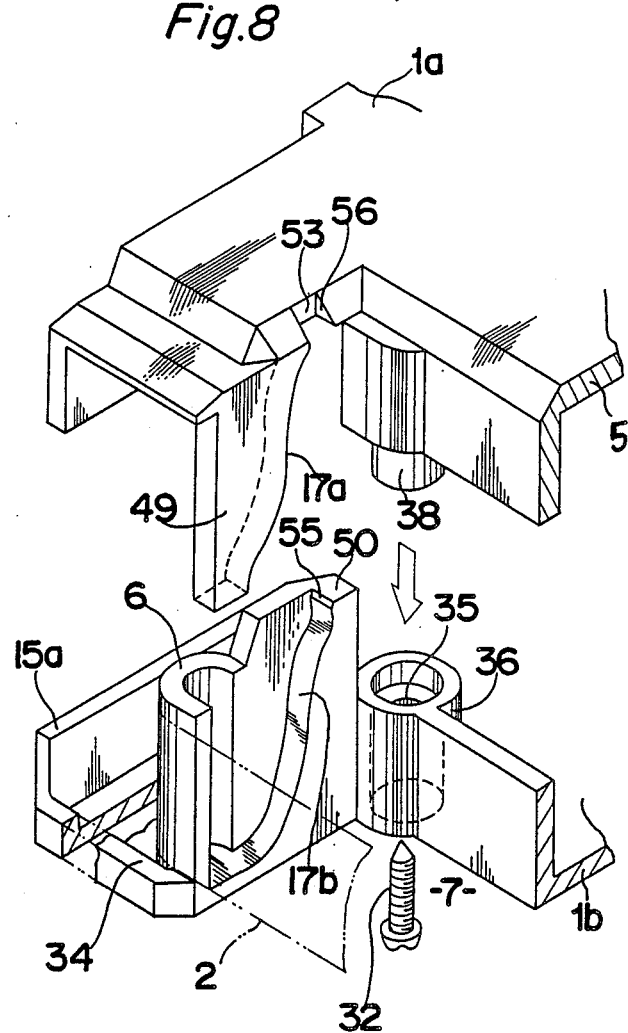
FIG. 8 is an exploded perspective view of another embodiment of the cam groove.

Referring now to FIG. 8, there is shown another embodiment of the cam groove 17 in which a pair of tape path restriction pins 6 having partially arcuate outer peripheries are integrally provided in the bottom wall 4 of the cartridge case 1, projecting upward over the vertical width of the video tape 2. The bottom wall 4 of the cartridge case 1 is further integrally provided with a rib 34 extending between the recessed portions 15a of the side walls 15 of the cartridge case 1 for restricting the height of the video tape 2. In this embodiment, the top section 1a and the bottom section 1b are connected with each other by screws at the left and right of the front portion, the longitudinal and lateral center and the left and right of the rear portion. In each of the screw-connecting portions, a boss 36 having a screw insertion hole 35 is upwardly projecting formed in the bottom wall 4 of the cartridge case 1 while another boss 38 also having a screw insertion hole 37 is downwardly projectingly formed in the upper wall 6 of the cartridge case 1 opposed to the screw insertion hole 35, and a tapping screw 32 is inserted from below the bottom section 1b in the screw insertion hole 35 to be threadedly received by the screw insertion hole 37.

In assembling of the recording tape cartridge having the aforementioned construction, the tape reels 3 winding the video tape 2 are first fitted with the bottom section 1b while guiding the video tape 2 along a predetermined tape path. At this time, the video tape 2 is guided and supported by the tape path restriction pins 6 projecting upward from the bottom section 1b. Next the top section 1a is placed on the bottom section 1b and connected with the same by the tapping screws 32 in the aforementioned manner. Thereafter, in general, the front lid member 9 previously provided with the dust cover 12 through the mounting member 14 and the shaft 24 is guided from above the cartridge case 1 to be pivotally connected therewith by engagement of the pivotal shafts 13 and the through-holes 13a while the cam follower 24a of the dust cover 12 is inserted from above in the cam groove 17 of the cartridge case 1 through the recess 53.

In the case where the tape guide members 6 are projectingly provided in the bottom section 1b, the video tape 2 can be arranged in the cartridge case 1 along the predetermined tape path by the pins 6 without the necessity of additional support members. Therefore, the video tape 2 extending along the front surface of the cartridge case 1 is stretched by the tape guide members 6, and further, the height thereof is restricted by the rib 34. Consequently, the front lid member 9, having the dust cover 12, is not guided from the front surface of the cartridge case 1 to be connected thereto but guided from above the cartridge case 1, though, even in such a case, the front lid member 9 and the dust cover 12 are reliably prevented from interference with the upper edge of the video tape 2 as well as from engagement with the lower edge of the video tape 2.

The rib 34 functions, in addition to restriction of the tape height in assembling of the video tape 2, to also restrict the height of the video tape 2 after it is separated from the tape guide members 6 and guided for running by vertical guide members (not shown) of the video tape player. The rib 34 further functions to reinforce both the lower edges of the front surface of the cartridge case 1 which are supported by margins of the video tape player when the video tape cartridge is mounted therein.

As hereinabove described, the cartridge case 1 is integrally provided in its front end portions with the tape guide members 6 projecting upward from the bottom wall 4 for guiding the video tape 2 along the front surface of the cartridge case 1 as well as the rib 34 extending between the tape guide members 6 and the front end portions of the side walls 15 of the cartridge case 1 for restricting the tape height. Thus, in assembling the tape reels 3 with the bottom section 1b of the cartridge case 1 having the front lid member 9 for covering the front surface thereof while guiding the tape 2 along a predetermined tape path, the video tape 2 can be easily assembled with the cartridge case 1 since there is no need to temporarily support the tape 2 with provision of the tape guide members 6.

Further, though the tape guide members 6 integrally projected from the bottom wall 4 cannot be secured in a completely vertical condition, such incompleteness in verticallity of the tape guide members 6 is compensated for by the tape height restriction ribs 34 since the ribs 34 support the lower edge of the video tape 2, even if the outer peripheries of the tape guide members 6 are inclined. That is, the video tape 2 is effectively prevented from being loosened and inclined in a condition extended between the tape guide members 6 as well as from interference with the front lid member 9 in the assembly thereof. Further, also in a case where the video tape 2 is drawn out from the tape reel 3 and guided by the tape guide members 6 to run along the front surface of the cartridge case 1, the tape 2 is effectively prevented by the tape height restriction ribs 34 from vertical movement caused by inclination of the tape guide members 6 as well as in a case where the video tape 2 is separated from the pins 6. In addition, these functions are effected simply by integral forming alone without necessity of separately-formed members as in the prior art.

A lid locking device is mounted in the clearance 11a as described below.

Figure 5:
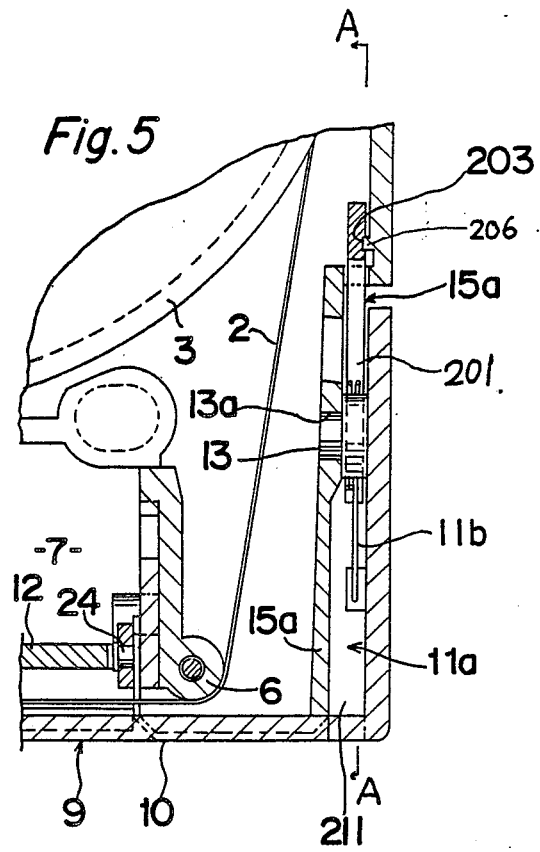
FIG. 5 is a partially enlarged cross sectional view of the recording tape cartridge.
Figure 6:
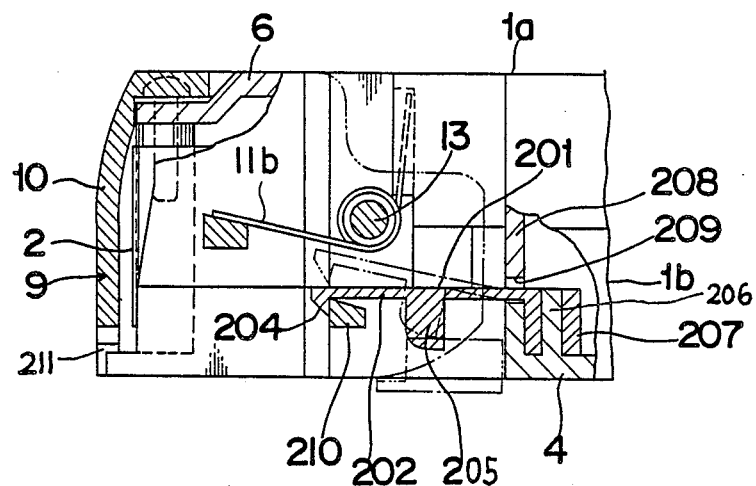
FIG. 6 is a cross sectional view taken along the line A—A in FIG. 5.

As shown in FIGS. 5 and 6, the locking member 201 is formed by an elastically deformable plastic resin material, which comprises a thin flat plate 202, a base end member 207 projecting downward from the base end portion of the flat plate 202 and having a longitudinal groove 203, an engaging pawl 204 projectingly formed in the lower surface of the forward end of the flat plate 202 and a pressed member 205 projectingly formed in the lower surface of the longitudinal center of the flat plate 202. The locking member 201 is fitted in the bottom section 1b prior to assembling the top section 1a and the bottom section 1b. That is, the base end member 207 of the locking member 201 is inserted in the interior of the lower wall member of the bottom section 1b from above to bring the longitudinal groove 203 into sliding engagement with the vertical rib 206. Then the top section 1a is assembled with the bottom section 1b to be connected therewith by screws in such a manner that the lower surface of the upper wall member 208 of the top section 1a is brought into contact with the upper surface of the flat plate 202 of the locking member 201 to prevent the base end portion of the flat plate 202 from being raised. Thus, the base end member 207 of the locking member 201 is supportedly fixed to the cartridge case 1 in a cantilever manner, so that the flat plate 202 substantially horizontally extends into the narrow rear portion of the clearance 11a via the through-hole 209. In this condition, the flat plate 202 of the locking member 201 is positioned below the pivotal shaft 13 such that the engaging pawl 204 is located forewardly of the pivotal shaft 13 to be engagingly in contact, by virtue of elasticity of the flat plate 202, with an engaging member 210 projectingly formed in the inner surface of the right-hand connecting member of the closed front lid member 9 from above.

In such a condition, the engaging pawl 204 in the forward end of the locking member 201 is continuously engaged with the engaging member 210 of the front lid member 9 from above to prevent the front lid member 9 from being rotated about the pivotal shafts 13 to the opened position, thereby locking the same in the closed position. When the video tape cartridge is mounted in the video tape player with the front lid member 9 closed in the aforementioned manner, a locking release member fixed in the video tape player is relatively guided in the forward direction to enter the clearance 11a through the recess 211 of the front lid member 9 and press the front lower end of the pressed member 205 of the locking member 201. By virtue of this, the flat plate 202 of the locking member 201 is elastically deformed upwardly from its base end portion, so that the engaging pawl 201 is disengaged from the engaging portion 210 of the front lid member 9, thereby releasing the front lid member 9 from being locked in the closed position.

Attention is now drawn to that construction of the closing mechanism for closing the lower end portion of the tape space accommodation space formed by the inner surface 10a of the front plate 10 of the front lid member 9 and the lower end of the dust cover 12 when the recording tape cartridge is not in use.

Figure 9:
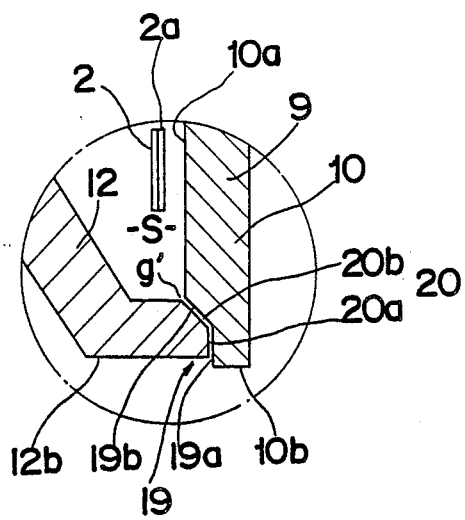
FIGS. 9 through 16 are cross sectional views showing modifications of arrangement of the front lid member and the dust cover of the present invention.

In FIG. 9 showing the front lid member 9 in a closed condition, the front lid member 9 has a concavity 19 recessedly formed in a corner between the inner surface 10a and the lower end surface 10b of the front plate 10 to present a vertical marginal surface 19a reaching the lower end surface 10b and a connecting surface 19b which is slanted for connecting the marginal surface 19a with the inner surface 10a. On the other hand, the dust cover 12 has its bottom portion horizontally bent to extend up to the lower end portion 12b for entering the concavity of the front plate 10 when the front lid member 9 is in the closed position, and a forward end surface 20 (20a and 20b) of the lower end portion 12b opposing to the front plate 10 is formed in conformity with the concavity 19 along the longitudinal direction of the front plate 10, i.e., the cartridge case 1. Preferably, the lower forward end surface 20 of the dust cover 12 is entirely in contact with the marginal surface 19a and the surface 20b with the connecting surface 19b of the lower concavity 19 of the front plate 10, or, closely opposed thereto as the case may be.

It is to be noted that since the vertical marginal surface 19a of the concavity 19 is formed in an outwardly stepped manner with respect to the inner surface 10a of the front plate 10 within the range of thickness of the front plate 10, the lower forward end surface 20 of the dust cover 12 is extended outwardly over the inner surface 10a of the front plate 10, thereby forming a gap g having a curved configuration and preventing defining of a vertical straight gap communicating with the exterior immediately below the inner surface 10a of the front plate 10. Even if the lower forward end surface 20 of the dust cover 12 is not properly in contact with the concavity 19, dust is prevented from entering a tape accommodating space S between the front plate 10 and the dust cover 12 since a gap g' defined between the concavity 19 and the lower forward end surface 20 creates a detour, and thus the recording surface of the video tape 2 is effectively prevented from being damaged by entering of foreign matters including dust.

With the concavity 19 formed with the downwardly inclined connecting surface 19b as shown in this embodiment, the lower forward end surface 20 of the dust cover 12 which is conformed to the concavity 19 naturally has a vertical marginal portion 20a and an inclined surface 20b. Since the upper end corner of the forward end surface 20 is bevelled, the forward end surface 20 can be smoothly engaged in the concavity 19 even if dimensions of the front lid member 9 and the dust cover 12 are strictly accurate, in other words, fitting of the forward end surface 20 in the concavity 19 is tight, leading to effective sealing contact of the vertical marginal portion 20a with the vertical marginal surface 19a and of the inclined surface 20b with the connecting surface 19b.

Figure 10:
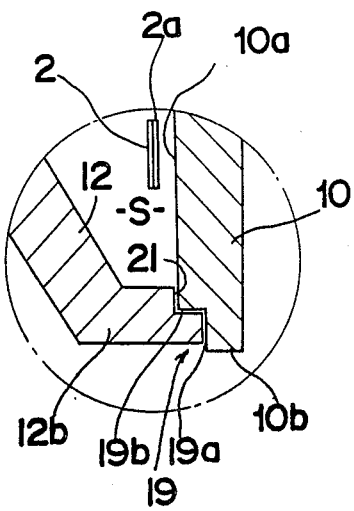

FIGS. 10 through 16 show various modifications of the arrangement for closing the tape accommodating space S by the front lid member 9 and the dust cover 12. In FIG. 10, the front plate 10 of the front lid member 9 may be provided with a rectangular concavity 19, the function of which is substantially identical to that of the aforementioned embodiment while the concavity 21, having a rectangular stepped configuration in cross section, is formed in a upper front corner of the dust cover 12, so that the lower end portion of the dust cover 12 is brought into surface contact with the lower end of the inner surface 10a of the front plate 10 and with the marginal surface 19a and the connecting surface 19b of the concavity 19, respectively.

Figure 11:
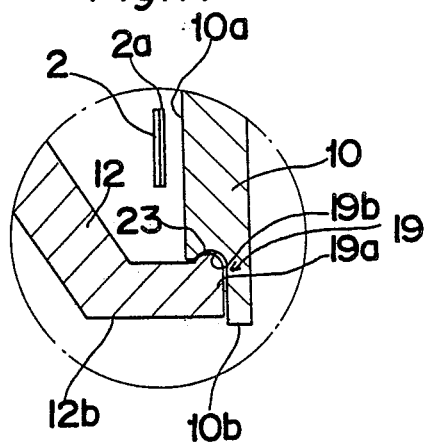

Further, as shown in FIG. 11, the concavity 19 may be formed in the intersection between the inner surface 10a and the lower end surface 10b of the front plate 10 of the front lid member 9 while the connecting surface of the concavity 19 is formed as a semicircular concave surface so that an annular projection 23 formed in the forward end of the lower end portion 12b of the dust cover 12 is loosely fitted in the concavity 19.

Figure 12:
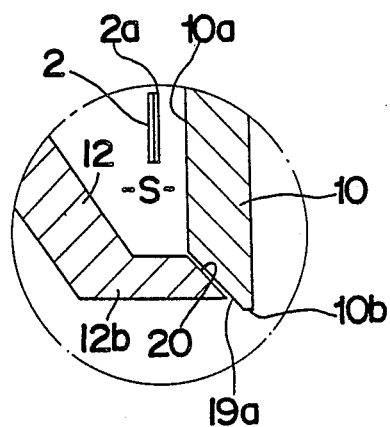

As shown in FIG. 12, still further, a corner of intersection between the inner surface 10a and the lower end surface 10b of the front plate 10 may be formed as an inclined marginal surface 19a while forming the forward end surface 20 of the lower end portion 12a of the dust cover 12 as an inclined surface which is brought into surface contact with the inclined marginal surface 19a of the front plate 10, so that the video tape 2 is effectively prevented from being damaged by contact with a foreign matter even if such a matter is inserted from between the forward end surface 20 of the dust cover 12 and the inclined surface of the front plate 10.

Figure 13:
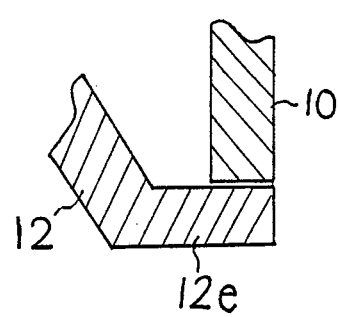
Figure 14:
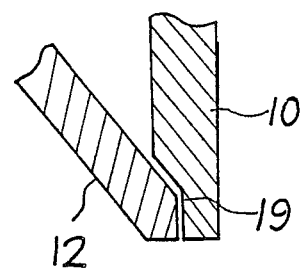
Figure 15:
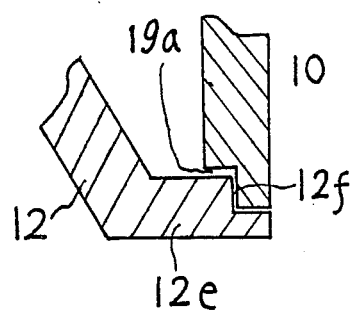
Figure 16:
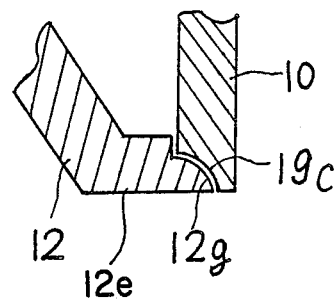

In FIG. 13, the lower end of the dust cover 12 is formed as a closing plate 12e extending horizontally below the lower end of the front plate 10 of the front lid member 9 to the front surface of the front plate 10. In FIG. 14 the lower end portion of the dust cover 12 extends downward, slantingly upward to the intermediate portion of the front plate 10 so as to befitted in the concavity 19 formed in the lower end of the front lid 10, when the front lid member is in the closed position. In FIG. 15, the closing plate 12e extending horizontally below the front plate 10 is formed with a stepped portion 12f which can be fitted in the concavity 19a in the lower end of the front lid plate 10. In this case the front end of the closing plate 12e extends up to the front surface of the front plate 10. In FIG. 16, the front end of the closing plate 12e is formed with an arcuate portion 12g which can be fitted in the concavity 19c having an arcuate configuration and defined in the lower end face of the front plate 10. It is noted that the respective closing mechanism shown herein are respectively formed substantially in a similar configuration over the entire length of the front lid member 9.

It is clear from the design of the front plate and dust cover of the present invention, the minimum distance the front plate must extend below the lower edge of the recording tape is the thickness of the lower end portion of the dust cover which extends beneath the recording tape.

The design of the recording tape cartridge according to the present invention may further be modified such that the concavity 19 is recessedly formed in the lower end portion of the inner surface 10a of the front plate 10 to be engaged with the lower end of the dust cover 12.

In the meantime, the cam grooves 17 and the cam followers 24a may be replaced by a link mechanism for vertically moving the dust cover 12 in association with operations for opening and closing the front lid member 9. Further, the upper plate member 12a of the dust cover 12 may not necessarily seal the upper opening of the pocket member 7 completely when the front lid member 9 is in the closed position.

It is noted that the present invention is not limitted to the video recording tape cartridge and can be used for various recording tape cartridge.

According to the present invention, as hereinabove described, the lower end of the dust cover 12 is brought into contact with or closely opposed to the lower end portion of the front plate 10 of the front lid member 9 in a condition extending outward over the inner surface 10a of the front plate 10 to define an inclined or a stepped gap. Therefore, even if the lower end of the dust cover 12 is not sealed with the lower end surface of the front plate 10, dust is effectively prevented from entering the cartridge case 1 from below the pocket member 7 and further prevented from sticking to the video tape 2 since the gap g' defined between the lower end of the dust cover 12 and the front plate 10 forms a simply constructed reliable detour for the dust. Further, even if foreign matter is inserted in the gap between the forward end surface of the dust cover and the inner surface of the front plate, such matters is prevented from entering the cartridge case by the detour of the gap and the video tape is effectively protected from being damaged by contact with such matter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording tape cartridge comprising a cartridge case having a space at a front face of said case for accommodating a recording tape which passes therethrough, said cartridge including a case body, a front lid member rotatably mounted to a front portion of said case body having a straight front plate portion with a lower end which extends a minimum predetermined distance below but not beneath said recording tape when said front lid member is rotated to a closed position, said front lid member being movable in a rotatable manner relative to said case body between said closed position and an opened position, and a dust cover movable with respect to said front lid member for enclosing said recording tape within said space when said tape cartridge is not in use, positioned to the rear of said front plate portion of said front lid member, said dust cover being provided as a single body having a lower end portion which extends beneath said recording tape perpendicular to said front plate portion of said front lid member and parallel to a lower edge of said recording tape to form a closing interlocking engagement with said lower end of said front plate portion of said front lid member when said front lid member is in said closed position for isolating said tape accommodating portion of said cartridge, said closing interlocking engagement forming a seal between said respective ends of said dust cover and said front plate portion of said front lid member, said minimum predetermined distance being substantially equal to the thickness of said lower end portion of said dust cover thereby providing said seal formed by said closing interlocking engagement for preventing dust from entering said tape accommodating space of said tape cartridge while at the same time minimizing the size of said tape cartridge 2. The recording tape cartridge according to claim 1, wherein said interlocking engagement is formed by inclined faces formed on the respective lower end surfaces of said front plate of said lid member and said dust cover.

3. The recording tape cartridge according to claim 1, wherein said interlocking engagement is formed by a stepped configuration in cross section defined in the lower end portion of said front plate of said lid member and a corresponding stepped portion formed in said lower end portion of said dust cover.

4. The recording tape cartridge according to claim 1, wherein said interlocking engagement is formed by a round, concave recess portion in cross section defined in said lower end portion of said front plate of said lid member and a corresponding round convex projection in cross section in said lower end surface of said dust cover.

* * * * *